June 20, 1944.　　　　L. A. DE ROSA　　　　2,352,082
FREQUENCY METER
Filed July 23, 1941　　　2 Sheets-Sheet 1
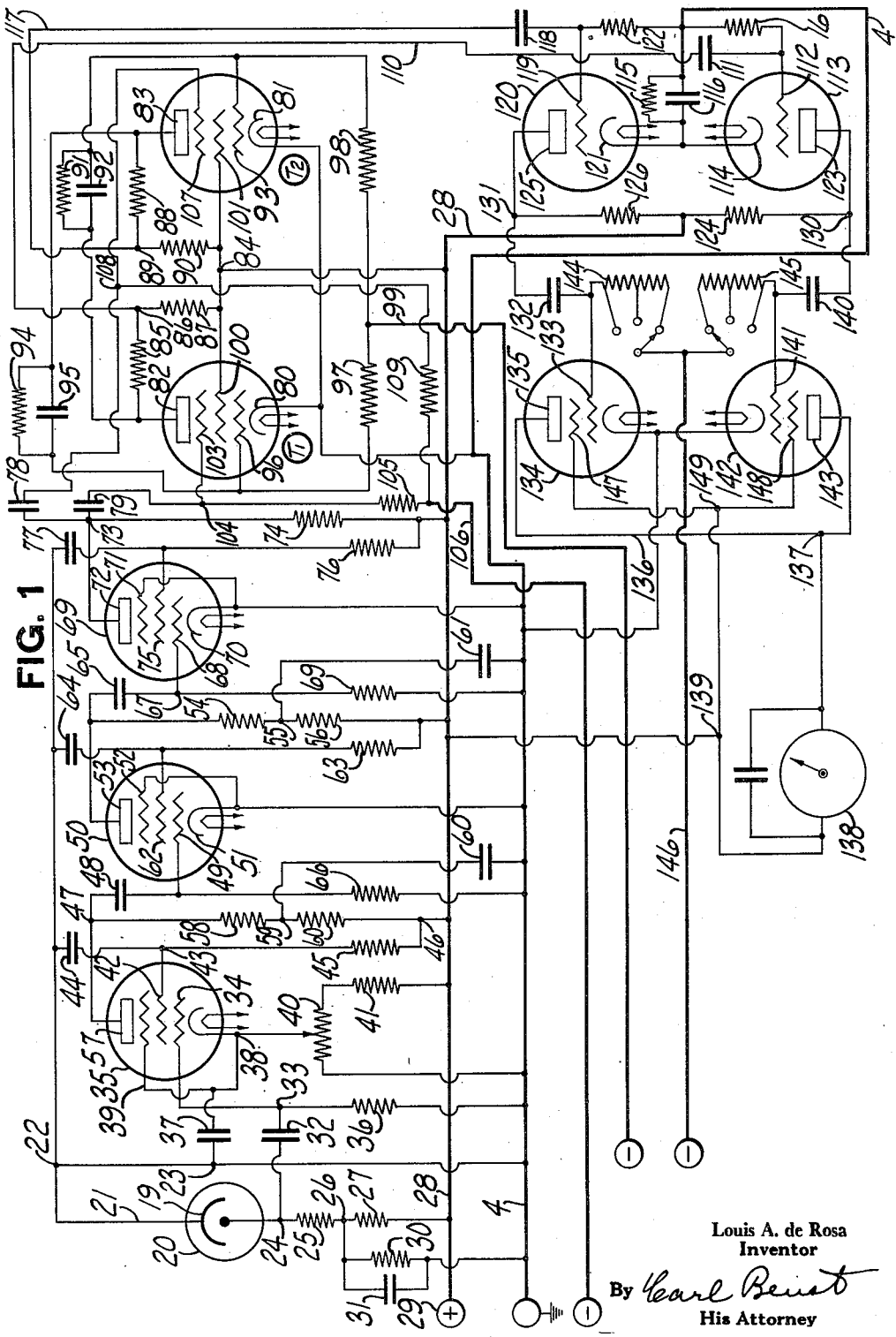
Louis A. de Rosa
Inventor
By Earl Benst
His Attorney June 20, 1944.   L. A. DE ROSA   2,352,082
FREQUENCY METER
Filed July 23, 1941   2 Sheets-Sheet 2
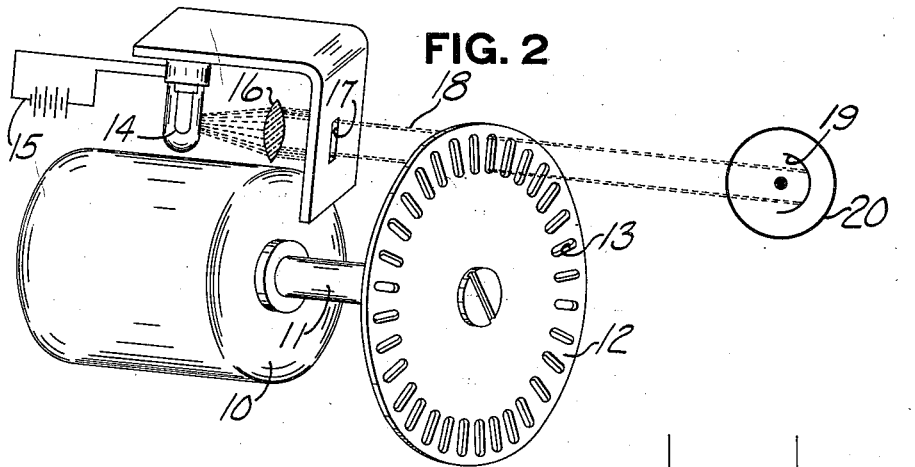
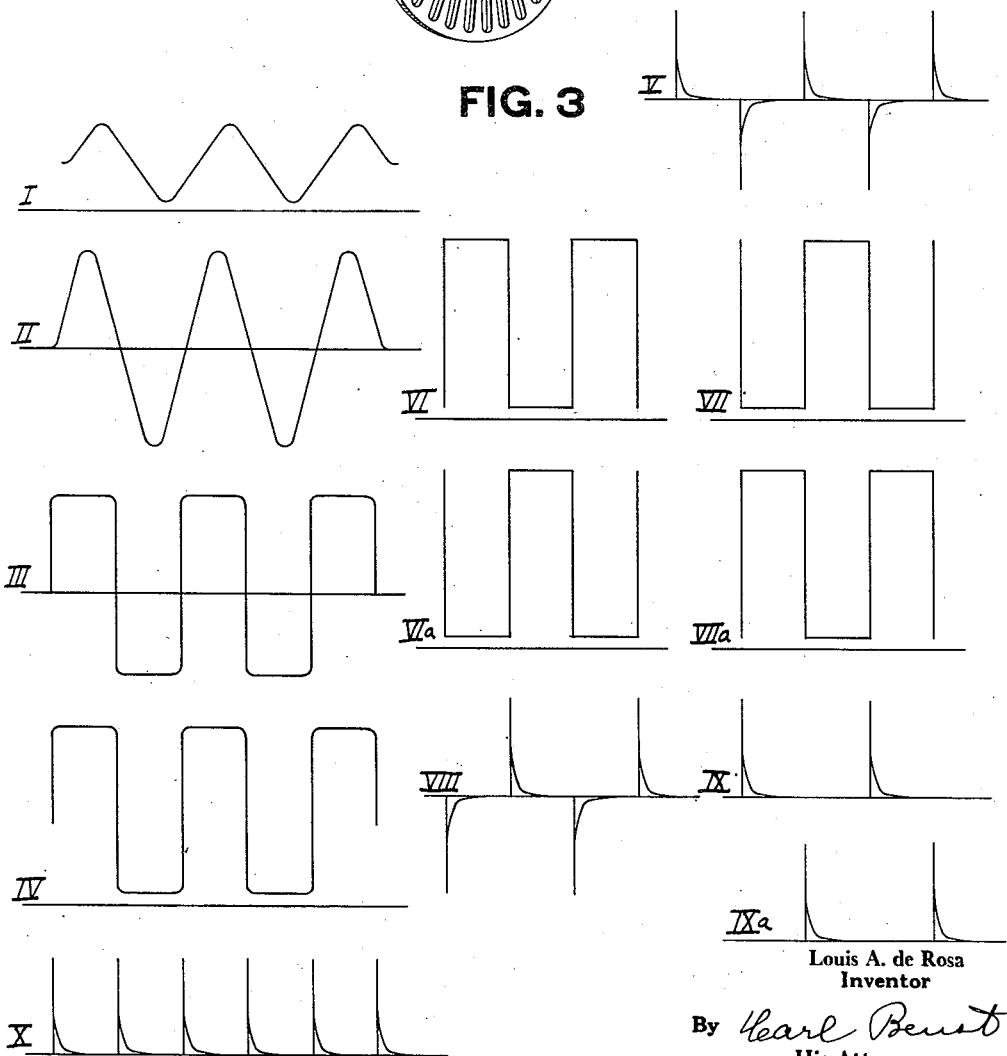
Louis A. de Rosa
Inventor
By *Earl Benst*
His Attorney Patented June 20, 1944

2,352,082

UNITED STATES PATENT OFFICE

2,352,082

FREQUENCY METER

Louis A. de Rosa, Dayton, Ohio, assignor to The National Cash Register Company, Dayton, Ohio, a corporation of Maryland Application July 23, 1941, Serial No. 403,744

15 Claims. (Cl. 172—245)

This invention relates to an electronic device for measuring frequencies of a nature that may be converted into electric impulses for actuation of the device.

The invention more particularly pertains to such a measuring device giving an average electric current output proportional to the input frequency without errors caused by variations in the amplitude of the input electric impulses. Moreover, the measuring device is capable of measuring high or low frequencies with the same accuracy.

Electronic devices of the average current type used for measuring frequencies, as heretofore known, have been subject to errors caused by variations in the amplitude of the electric impulses to be measured. In this invention, the frequency to be measured is caused to produce electric impulses which are modified by electronic devices and circuit elements to eliminate the effect of variations in the input amplitude. The impulses, freed of amplitude variation, are multiplied in frequency and integrated into a constant average current. The average current so produced is proportional to the frequency of the input, and adjustments may be made in dealing with high or low frequencies whereby the produced average current caused by a small change in either high or low frequencies is readily discernible, thus enabling the disclosed device to be used for measuring high or low frequencies with a high degree of accuracy.

The principal object of the invention is to provide a highly accurate and direct reading electronic frequency meter for measuring the frequency of electric impulses.

Another object of the invention is to provide such a frequency meter which is adjustable to give direct readings of either high or low frequencies with the same accuracy.

Another object of the invention is to provide such a frequency meter which is not affected by anomalous variations in amplitude of the input frequency impulses.

Another object of the invention is to provide such a frequency meter wherein the measured impulses are multiplied and integrated to produce a steady average current output regardless of the frequency to be measured.

Another object of the invention is to provide means to measure rotary speed and repeated or recurrent phenomena without imposing a measurable load upon the rotating or moving body.

Of the drawings:

Fig. 1 is a diagram showing connections between circuit elements comprised in the frequency meter.

Fig. 2 is a diagrammatic showing of means for analyzing rotary motion by causing impulses of light, proportional in frequency to the speed of rotation, to produce electric impulses.

Fig. 3 is a diagrammatic showing of the electric impulse wave forms at certain points in the circuit shown in Fig. 1.

General description

The invention is disclosed herein as used for measuring the speed of rotation of a motor without imposing any load thereon. The invention, however, is applicable to measuring periodic electric impulse frequencies produced in any manner, and is not to be limited to the particular embodiment shown.

In Fig. 2 there is shown, conventionally, a motor 10 having a shaft 11 to which is secured a light-chopping disk 12. The disk 12 is perforated radially by a plurality of holes 13. A light source consisting of electric lamp 14 operated by a battery 15 cooperates with a lens 16 and a directing slit 17 to direct a beam of light 18 through the holes 13 of the disk 12 onto the cathode 19 of a photo-electric cell 20 (Figs. 1 and 2). As the disk is rotated, the holes 13 act to interrupt the projection of the light beam upon cathode 19 and therefore cause an intermittent effect on the electric condition of photo-electric cell 20, which effect is proportional to the speed of rotation of shaft 11. This means for actuating a photo-electric cell is a convenient way of imposing thereon an intermittent effect proportional to the speed of rotating shaft 11 without imposing any load thereon.

Photo-electric cell 20 (Fig. 1) has its cathode 19 connected to ground through conductor 21, point 22, point 23, and conductor 4. The anode of photo-electric cell 20 is connected through point 24, resistor 25 of 500,000 ohms, point 26, and resistor 27 of 150,000 ohms to conductor 28 connected to a 250-volt positive terminal 29. Point 26 is also connected to ground through a resistor 30 of 60,000 ohms and a capacitor 31 of 16 microfarads, connected in parallel. Point 26 therefore maintains a positive electric potential relative to the cathode 19. The anode of the photo-electric cell 20 is connected through point 24 and capacitor 32 of .01 microfarad to point 33, to which is connected the control grid 34 of a pentode amplifying tube 35, which may be of the "6SJ7" type. Grid 34 is grounded through resistor 36 of 500,000 ohms. The cathode of amplifying tube 35 is connected through point 36, capacitor 37 of .25 microfarad, and point 23, to ground. Point 38 is given a slight positive potential, of about 1½ volts, by being adjustably connected through volume control resistance 40 of 5,000 ohms or less to ground and through a resistance 41 of 100,000 ohms to the 250-volt positive conductor 28. Suppressor grid 39 is tied to the cathode externally of the tube, and screen grid 42 is connected through point 43, resistance 45 of 400,000 ohms, and point 46 to the 250-volt positive conductor 28, and is coupled to ground conductor 4 through capacitor 44 of .1 microfarad and point 22. Anode 57 is connected through point 47, resistor 58 of 100,000 ohms, point 59, and resistor 60 of 50,000 ohms to the 250-volt positive conductor 28. Point 59 is coupled through capacitor 60 of .1 microfarad to ground conductor 4. With the grid thus biased slightly negative with respect to the cathode, tube 35 acts as a class A amplifier. If the electric potential impulses impressed on point 24 by the operation of the photo-electric cell in response to the light beam, said impulses being represented by Fig. 3 I, are impressed through capacitor 32, the potential at point 33 will take the wave form shown in Fig. 3 II, which is amplified by tube 35 without distortion.

The output from tube 35 is impressed through capacitor 48 of .01 microfarad onto grid 49, grounded through resistor 66 of 250,000 ohms, of high vacuum pentode tube 50, which may be of the "6SJ7" type, operated as a grid leak detector. Capacitor 48 may be decreased for use with higher frequencies. Cathode 51 and suppressor grid 52 are grounded. The anode 53 is connected to the 250-volt positive conductor through resistor 54 of 100,000 ohms, point 55, and resistor 56 of 50,000 ohms. Point 55 is grounded through capacitor 61 of .1 microfarad. Screen grid 62 is connected to the 250-volt positive conductor 28 through resistor 63 of 400,000 ohms and is coupled to ground through capacitor 64 of .1 microfarad. Under these conditions, the output of tube 50 after being impressed through capacitor 65 of .01 microfarad or less for higher frequencies, grounded through resistor 69 of 500,000 ohms, is of the flat top form shown in Fig. 3 III and is thereafter impressed through point 67 onto grid 68 of vacuum tube 69, which may be of the "6SJ7" type, also operated as a grid leak detector to accentuate the square top wave form. Anode 70 and suppressor grid 71 are grounded. Anode 72 is connected through point 73 and resistor 74 of 100,000 ohms to the 250-volt positive conductor 28. Screen grid 75 is connected to the 250-volt positive conductor 28 through resistor 76 of 250,000 ohms and is coupled to ground through capacitor 77 of .1 microfarad. At point 73, the wave form of the impulses is like that shown in Fig. 3 IV, which impulses are impressed through small capacitors 78 and 79 each of 10 micro-microfarads to produce a sharp wave form like Fig. 3 V having both negative and positive components.

Vacuum tubes T1 and T2, which may be of the "6SJ7" type, are connected in a trigger circuit wherein one or the other, but only one, of the tubes is conducting at a given instant and a slight potential impulse of either polarity impressed commonly on the suppressor grids of both tubes will change their mode of operation, the characteristics of the trigger circuit being such that the output current is practically free from the amplitude characteristics of the triggering impulses impressed on the suppressor grids.

The cathodes 80 and 81 of tubes T1 and T2 respectively are grounded by being connected to conductor 4. The anodes 82 and 83 are given a positive potential by being connected to point 84, which is connected to the 250-volt positive supply conductor 28. Anode 82 is connected to point 84 through resistor 85 of 50,000 ohms, point 86, and resistor 87 of 5,000 ohms. Anode 83 is connected to point 84 through resistor 88 of 50,000 ohms, point 89, and resistor 90 of 5,000 ohms. Anode 82 of tube T1 is connected through resistor 91 of 500,000 ohms in parallel with capacitor 92 of 25 micro-microfarads to control grid 93 of tube T2. Anode 83 of tube T2 is connected through resistor 94 of 500,000 ohms in parallel with capacitor 95 of 25 micro-microfarads to control grid 96 of tube T1. Control grids 93 and 96 are negatively biased by being connected respectively through resistors 97 and 98, each of 400,000 ohms, to a conductor 99 connected to a supply terminal impressed with a negative potential of 100 volts. Screen grid 100 of tube T1 and screen grid 101 of tube T2 are also connected to point 84, which is connected to the 250-volt positive supply conductor 28. Suppressor grid 103 of tube T1 is connected through point 104 and resistor 105 of 400,000 ohms to conductor 106 supplied with 250 volts negative potential. Suppressor grid 107 of tube T2 is connected through point 108 and resistor 109 of 400,000 ohms to supply conductor 106. Suppressor grids 103 and 108 receive the impulses impressed through capacitors 79 and 78 respectively. As these impulses are both positive and negative in polarity, and the trigger tubes T1 and T2, because of the method of coupling, change their mode of operation on either a positive or a negative impulse, it follows that the tubes T1 and T2 will change their mode of operation twice for each impulse issuing from the photo-electric cell 20. At points 86 and 89, there is a negative surge of potential when conduction occurs in the tubes T1 and T2, respectively, due to resistance 109, and the same points 86 and 89 have a positive surge of potential when said associated one of the tubes ceases conducting. The wave form of the potential surges at points 86 and 89 are of the square-topped variety shown in Fig. 3 VI and VII, forms VI and VII being the same but out of phase due to the fact that tubes T1 and T2 are always in opposite condition as regards conduction.

Point 86 is coupled by means of conductor 110 through capacitor 111 of .01 microfarad to control grid 112 of vacuum amplifier triode tube 113, which may be of the 6N7 type and the cathode 114 of which is grounded through being coupled to conductor 24 through resistor 115 of 2,500 ohms in parallel with capacitor 116 of 25 microfarads. Grid 112 is connected to ground conductor 4 through resistor 16 of 500,000 ohms. Anode 123 is connected through resistor 124 of 100,000 ohms to the 250-volt positive supply conductor 28.

Point 89 is connected by means of conductor 117 and capacitor 118 of .01 microfarad to control grid 119 of vacuum amplifier 120, which may be of the 6N7 type, having a cathode 121 connected to ground through the capacitor 116 and the resistor 115 before mentioned. Grid 119 is connected to ground conductor 4 through resistor 122 of 500,000 ohms. Anode 125 is connected through resistor 126 of 100,000 ohms to the 250-volt positive supply conductor 28.

Vacuum tubes 120 and 113 are, therefore, connected in the circuit as class A amplifiers. The purpose of these amplifiers 113 and 120 is to prevent a current drain from the trigger tubes T1 and T2 and yet make available the wave form of the potentials of points 86 and 89. The output of tubes 113 and 120 is taken from points 130 and 131, respectively, and is of the wave type shown in Figs. 3VIa and 3VIIa, which form is the reverse phase from that shown in Figs. 3VI and 3VII.

The potential changes of point 131 are impressed through small capacitor 132 of 50 micro-microfarads and onto the grid 133 of a 6L6 type of beam power vacuum amplifier tube 134, having an anode 135 connected by conductor 136 to point 137 through capacitor shunted galvanometer 138, and point 139 to the 250-volt positive conductor 28. The potential changes at point 130 are impressed through small capacitor 140 of 50 micro-microfarads onto the grid 141 of another 6L6 type of tetrode amplifier 142, whose anode 143 is connected to point 137 and through capacitor shunted galvanometer 138 to the positive potential supply conductor 28 by the same means as described for tube 134. Grids 133 and 141 are biased through 31,500-ohm variable resistors 144 and 145, respectively, to negative conductor 146 supplied with 20 volts negative potential. Screen grids 147 and 148 are connected through point 149 to point 139 having a potential of 250 volts positive. The cathodes 150 and 151 are grounded. With the described connections, tubes 134 and 142 act as class C amplifiers.

The wave forms appearing on grids 133 and 141 are shown in Fig. 3VIII. The output of tube 134, as appears in its anode 135, is like the wave form shown in Fig. 3IX, and the output of tube 141, as appears on its anode 143, is like the wave form shown in Fig. 3IXa. The combined wave form appearing at point 137, which actuates galvanometer 138, is shown in Fig. 3X, which is double the frequency of the input wave, as shown in Fig. 3I.

The wave forms appearing on the grids 133 and 141 of the power amplifier tubes 134 and 143 have a logarithmic decay period. By decreasing the resistance in the variable resistors 144 and 145, the output impulses from tubes 134 and 143 may be made discrete, and, conversely, an increase of the same resistance will cause the decay of one of the impulses to merge with the onset of the next impulse. By adjustment of resistors 144 and 145, it is possible to maintain an average current flow through galvanometer 138 at its point of greatest sensitivity, whether high or low input frequencies are being impressed on the point 33.

The point at which the resistors 144 and 145 should be adjusted depends on the characteristics of the galvanometer and the frequency to be measured, the most sensitive point being where the current impulses are sufficiently integrated so that the average current is just free enough from pulsation to prevent sensible vibration of the indicator. At that point, the least variation from a steady frequency may be perceived by movement of the indicator of the galvanometer.

Because of the filtering and the action of the tubes T1 and T2, the average current impressed into the galvanometer is free of amplitude variations of the input; by the doubling of the input frequency, a more perfect measure of the frequency is made; and by the adjustable resistances in the grid circuit of the power tube whose output operates the galvanometer, the most sensitive portion of the galvanometer scale may be utilized so that the most transient frequency variations may be discovered. The output from point 137 is, of course, available for controlling a cathode ray type of analyzing device.

One of the characteristics of the output current level at point 139 is that it varies logarithmically with the input frequency. This non-linear response makes the frequency meter especially adapted for measuring frequencies where it is desired to have a greater variation of current level for a unit change at low frequencies as compared with high frequencies. Of course, the adjustable elements may be so adjusted that the instantaneous current level between impulses approaches zero; then the input frequency and the current level at point 137 have a linear relation.

It is to be understood that it is not intended to confine the invention to the one form or embodiment herein disclosed, for it is susceptible of embodiment in various forms all coming within the scope of the claims which follow.

What is claimed is:

1. In combination, means to convert electric potential sine wave impulses to peaked impulses of both polarities, the total number of said peaked impulses being double the number of full sine wave impulses; means to convert the peaked impulses of opposite polarity to peaked impulses of the same polarity, said last-named impulses having a logarithmic decay slope; and means to integrate the last-named impulses into an average current.

2. In combination, means to convert electric potential sine wave impulses to peaked impulses of both polarities, the total number of said peaked impulses being double the number of full sine wave impulses; means to convert the peaked impulses of opposite polarity to peaked impulses of the same polarity, said last-named impulses having a logarithmic decay slope; and means to integrate the last-named impulses into an average current, said means including capacitors discharged through resistors.

3. In combination, means to convert electric potential sine wave impulses to peaked impulses of both polarities, the total number of said peaked impulses being double the number of full sine wave impulses; means to convert the peaked impulses of opposite polarity to peaked impulses of the same polarity, said last-named impulses having a logarithmic decay slope; and means to integrate the last-named impulses into an average current, said means including electronic devices rendered conductive during a portion of the decay of each of said last-named impulses so that an average output current is produced.

4. A frequency-measuring device including the combination of a source of periodic electric signals whose frequency is to be measured; means actuated by the periodic signals to produce double their number in the form of peaked electric signals each having a logarithmic decay; and means to integrate the peaked signals into an average current proportional to the frequency of the source signals.

5. A frequency-measuring device including the combination of a source of periodic electric signals whose frequency is to be measured; means for converting the periodic signals into double their number in the form of peaked electric signals; means including capacitance discharged through resistance for causing the peaked signals to have a logarithmic decay; means to integrate the peaked logarithmic decay signals into an average current; and means to adjust the decay period in order to adjust the level of the average current.

6. A frequency-measuring device including the combination of a source of periodic electric signals; means to amplify the signals; means to filter and distort the signals so as to form peaked signals; means to double the number of the peaked signals, said doubled peaked signals being independent of the amplitude of the source signals but directly proportional in number thereto; means to adjust the decay period of the doubled signals; means to integrate the doubled signals so as to form an average current; and a current-measuring device, having a critical damping point, into which measuring device said doubled and integrated signals are fed, said decay adjustment being made so that the average current will actuate the current-measuring device so as not to sensibly follow the individual signals.

7. A frequency-measuring device including, in combination, a rotating body; means to produce a number of periodic electric signals proportional to the speed of the rotating body; means to filter the signals to produce peaked impulses; means to produce a positive and a negative peaked impulse for each of said filter-produced impulses; two electron tubes arranged in a trigger circuit so that their mode of operation is changed by each commonly-received peaked impulse be it positive or negative, said trigger tubes being impressed with said positive and negative impulses; means to cause an output peaked electric impulse on each change in the mode of operation of the trigger tubes, said output impulses being independent of the amplitude of the periodic signals; means to adjust the decay period of said output impulses; means to integrate the adjusted output impulses to produce a constant average current; and current-measuring means, having a critical steady reading point, into which the adjusted impulses are fed, the frequency of the periodic signals being a function of the adjustment means and the current measured by the current-measuring means.

8. In a frequency-measuring device, the combination of a source of periodic electric impulses; means responsive to the impulses for producing secondary impulses having double the frequency of the source impulses and no amplitude characteristic of amplitude variations of the source impulses; and means including a trigger-connected pair of electron tubes to integrate the secondary impulses into a direct current having a substantially even level proportional to the frequency of the first-metioned impulses.

9. In a frequency-measuring device, the combination of a source of light impulses; means to convert the light impulses into periodic electric impulses; means to create secondary impulses double the number of periodic impulses, said secondary impulses having no amplitude characteristic of amplitude variations of the light impulses; and means including a trigger-connected pair of electron tubes to integrate the secondary impulses into an average current.

10. In a frequency-measuring device, the combination of a source of light impulses; means to convert the light impulses into periodic electric impulses; means to create secondary impulses double the number of periodic impulses, said secondary impulses having no amplitude characteristic of amplitude variations of the light impulses; means including a trigger-connected pair of electron tubes to integrate the secondary impulses into a relatively non-fluctuating average current; and means to adjust the level of the average current thus produced.

11. In a frequency-measuring device, the combination of a source of light impulses; means to convert the light impulses into periodic electric impulses; means to create secondary impulses double the number of periodic impulses, said secondary impulses having no amplitude characteristic of amplitude variations of the light impulses; means including a trigger-connected pair of electron tubes to integrate the secondary impulses into an average current; and means responsive to the average current for measurement thereof.

12. In a frequency-measuring device, the combination of a source of light impulses; means to convert the light impulses into periodic electric impulses; means to create secondary impulses double the number of electric impulses, said secondary impulses having no amplitude characteristic of amplitude variations of the light impulses; means including an electron tube trigger pair to integrate the secondary impulses into an average current; and means movably responsive to the average current for measurement thereof, said average current being substantially without fluctuations of a character to vibrate the responsive means.

13. In a frequency-measuring device, the combination of a source of periodic input electric impulses to be measured; means to filter the impulses so as to produce discrete impulses of double the frequency of the input; means to eliminate from the doubled impulses any amplitude characteristics of the source impulses; means to shape the impulses last mentioned so as to have a sharp onset and a gradual decay period; means for adjusting the decay period so as to shorten or lengthen the time between the end of one impulse and the commencement of the next; and current-measuring means responsive to the impulses when properly adjusted so as not to follow the separate impulses but to register an average current thereof.

14. In a frequency-measuring device, the combination of a source of periodic input electric impulses whose frequency is to be measured; means to produce two peaked impulses having a logarithmic decay for each of the input electric impulses; means to integrate the logarithmic decay impulses into an average current; and means to adjust the decay period in order to adjust the level of the average current.

15. In a frequency-measuring device, the combination of a source of periodic input electric impulses whose frequency is to be measured; means to produce two peaked impulses having logarithmic decay for each of the input electric impulses; means to integrate the logarithmic decay impulses into an average current; and means to adjust the decay period in order to adjust the level of the average current, said average current being logarithmically proportional to the frequency of the input impulses.

LOUIS A. DE ROSA.